Dec. 20, 1960   H. HAIDEGGER   2,965,263
CHARGING DEVICE
Filed June 5, 1956   3 Sheets-Sheet 1
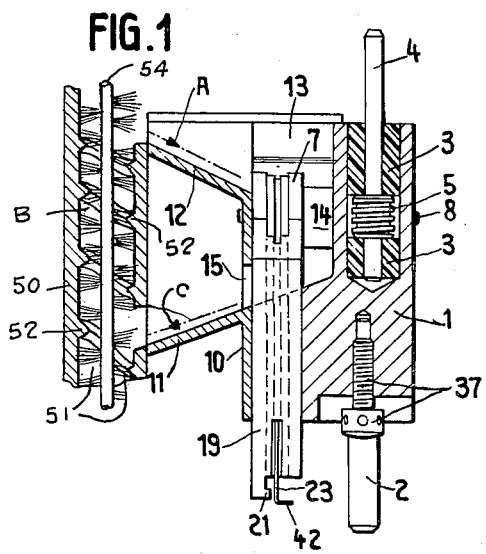
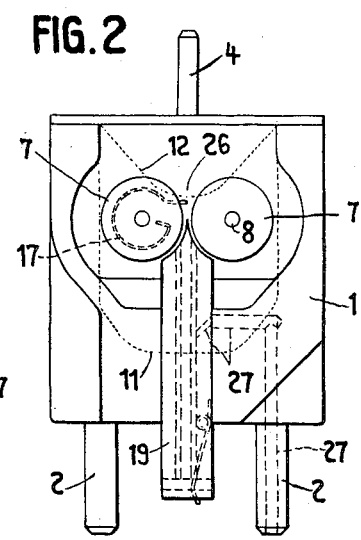
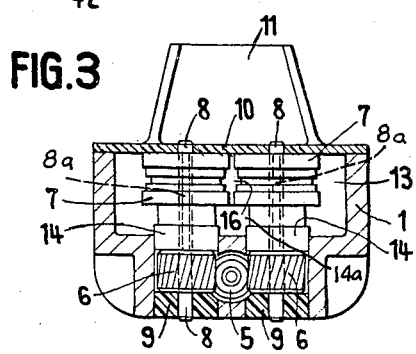
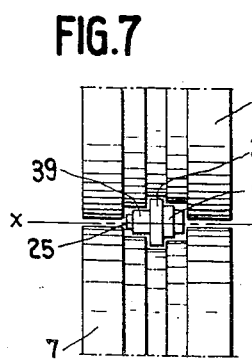
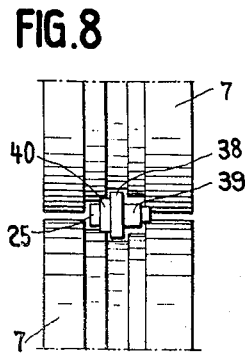
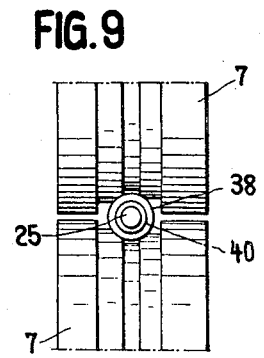
INVENTOR
Hans Haidegger
BY
ATTORNEY Dec. 20, 1960      H. HAIDEGGER      2,965,263
CHARGING DEVICE
Filed June 5, 1956      3 Sheets-Sheet 2
FIG. 4
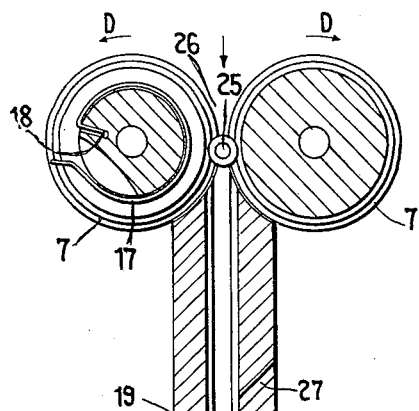
FIG. 5
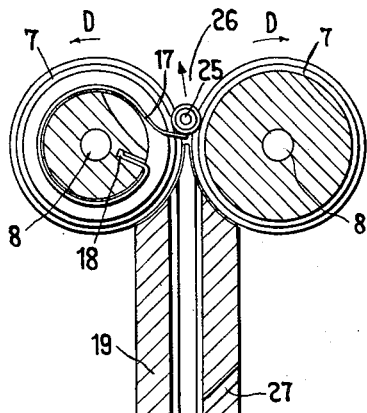
FIG. 6
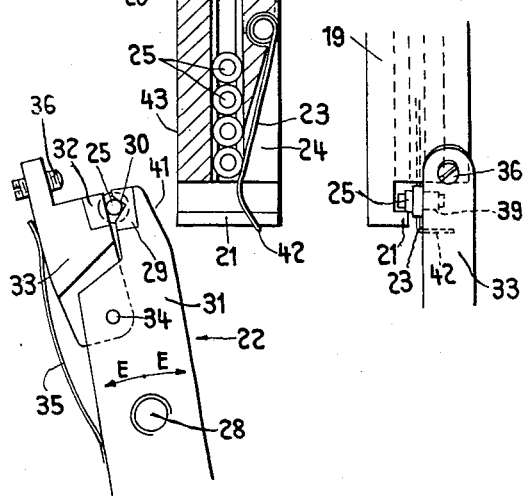
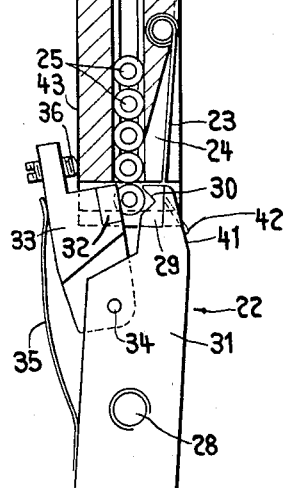
INVENTOR
Hans Haidegger
BY
Edward O'connor
ATTORNEY

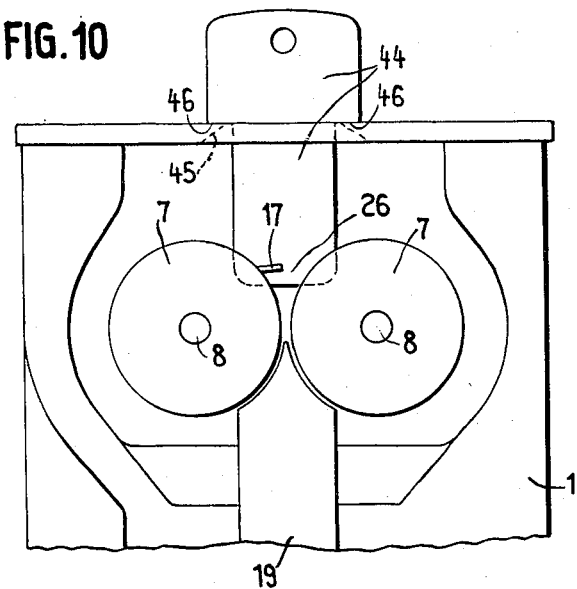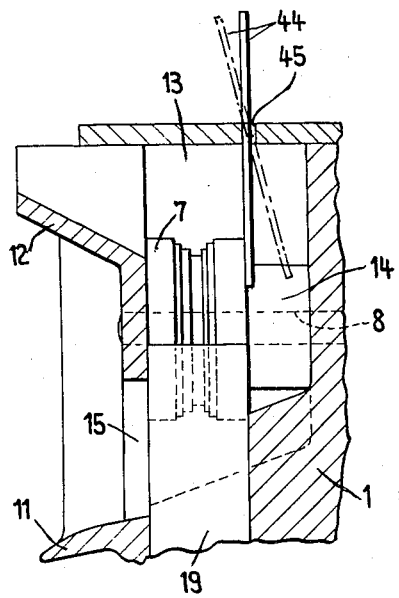

United States Patent Office 2,965,263
Patented Dec. 20, 1960

2,965,263

CHARGING DEVICE

Hans Haidegger, Solothurn, Switzerland, assignor to Ebauches S.A., Neuchatel, Switzerland Filed June 5, 1956, Ser. No. 589,474

Claims priority, application Switzerland July 30, 1955

5 Claims. (Cl. 221—162)

The present invention relates to a charging device having a feed channel preceding an extracting device, and two bodies, for instance rollers, preceding the feed channel and rotating away from each other on the side remote from the said channel, the introduction of the workpiece into the feed channel being effected by the cooperation of the said rotating bodies through a passage between the said rotating bodies.

Known devices of this type serve to feed screw nuts into a nut milling machine. The rollers rotating in opposite directions are each formed of two parts, that is, a cone provided with conveyor ribs extending obliquely and a cylindrical part connected with the tapered end of the said cone. The cylindrical parts of the rollers form between themselves a passage for the nuts when the latter have been brought into a perpendicular position. These cylindrical parts present cams formed by milled recesses which serve to rotate round their axis the nuts which are already in a vertical position, until two flanks of the nut spaced apart from each other by a distance equal to the width over flats of the nuts lie parallel to the walls of the feed channel.

This known device does not permit the charging of workpieces the axis of which has to be tilted for example by 90 or 180° so as to take its correct position with respect to the inlet passage, this case occurring chiefly for workpieces having an unsymmetrical cross-section, as for instance in fine or precision mechanics such as in watch making. The known device can be used only for moving a workpiece through the passage of the charging device when it is sufficient to turn the workpiece around its own axis.

In the charging device in accordance with the invention the profile of the passage or discharge opening formed by the two rotating bodies, e.g. rotating rollers, corresponds to the profile of the workpieces and an ejector means is provided, consisting for example of a spring, which intermittently projects into the said passage for throwing back and turning over the workpieces which are in an incorrect position with respect to the passage. If for instance a workpiece having an unsymmetrical profile arrives before the said passage with its axis placed in a position forming an angle of 90 or 180° with the correct position with respect to the profile of the passage, so that it cannot go through the passage, the ejector throws back this workpiece once or several times until its axis has been tilted by 90 or 180° and the workpiece falls again onto the passage in a correct position.

Moreover, the device in accordance with the invention is so designed that on charging even precision workpieces are carefully handled. The ejector may consist of a weak spring and the workpieces may be fed into the space above the passage in a direction transverse to the plane of rotation of the rollers, so that the workpieces do not pile up as is the case with vertical hoppers and are not damaged by one another. If, in accordance with the invention, a return way is branched above the passage parallel to the feed channel and passes by the side of the rollers, the charging device can operate without interruption. As a matter of fact, as soon as the feed channel is filled up or for any other reason too many workpieces arrive above the passage, these workpieces can be delivered into the return way by the ejector. In order to prevent such a delivery into the return way when feeding the feed channel should be continued, it is possible to provide a swingable intercepting plate or the like between the passage and the return way. When a single workpiece strikes against this plate the latter does not swing sufficiently to clear the inlet opening of the return way, so that it urges the workpiece to fall back onto the passage.

The charging device in accordance with the invention may serve for charging machine tools and measuring devices of any type.

The accompanying drawings show, by way of example, one embodiment of the invention. There is shown in the drawings only what is necessary for an understanding of the invention.

Fig. 1 is a vertical cross-section through the axis of the driving worm positioned between the two rotating rollers, the channel being shown in elevation view.

Fig. 2 is a view taken from the left in Fig. 1, the cover with its chutes being removed.

Fig. 3 is a plan view of the two rotating rollers and their drive means.

Figs. 4 and 5 are sectional views at an enlarged scale through the middle cross sectional plane of the two rotating rollers, the ejector spring, the stop spring and the extracting device having different positions.

Fig. 6 is a view of the extracting device and of the lower portion of the magazine including the feed channel, taken from the left in Fig. 4.

Figs. 7 to 9 are top views at an enlarged scale of the rotating rollers, illustrating the action of same.

Fig. 10 illustrates at an enlarged scale a detail of Fig. 2 and an intercepting plate of a modified embodiment.

Fig. 11 is a vertical sectional view through the construction of Fig. 10, parallel to the axes of rotation of the rollers, the intercepting plate being shown in elevation view.

A drive shaft 4 carrying a driving worm 5 is journalled in nylon bearings 3 of a casing 1 provided with plugs 2, the driving worm 5 being rotated by a source of energy not illustrated. The driving worm 5 meshes with two worm wheels 6 (Fig. 3) each of which is carried by a shaft 8. The worm wheels 6 are rigidly attached to the shaft 8, while the rollers 7 are removably attached to the shaft 8 in any conventional manner, as by a splined construction generally indicated at 8a, together with a profilated roller 7. Both shafts 8 are pivoted in nylon bearings 9 of the casing 1 and in a cover 10. The latter, which is removably fixed to the casing 1, for instance by means of screws, carries a lower return chute 11 and an upper chute 12. The casing 1 and the cover 10 define a space 13 containing the profilated rollers 7, the space 13 being closed on the side of the bearings 9 by collars 14 secured to the shafts 8 between the wheels 6 and the rollers 7. A return passage 14a is positioned at the ends of the rollers 7 and between the collars 14. The space 13 is connected with the return chute 11 through the return passage 14a by an opening 15 provided in the cover 10. The rollers 7 have such a profile that they define together a passage or discharge opening 16. The profile of the passage 16 (Figs. 3 and 7 to 9) corresponds to the profile of the longitudinal axial section of the workpieces to be let through, so that the said workpieces can pass through the passage only if they have a predetermined position.

In the region of smallest diameter, i.e. of the middle section of one of the rollers 7, a spring 17 is inserted at one of its ends in a slit 18 of the roller 7. This spring 17, acting as a stirrer or ejector, rests on the major portion of the roller circumference and its free end is bent towards the outside so that it can penetrate from the bottom into the passage 16 (Fig. 5). In order to handle the workpieces carefully, the spring 17 is chosen as weak as possible.

Immediately below the rollers 7 there is arranged a feed channel 20 formed by a magazine 19. The channel 20 has a symmetric cross-section, for a purpose explained below. The magazine 19, secured to the casing 1 consists of two longitudinal parts fixed to each other by means not illustrated, such as screws. At its outlet end, remote from the rollers 7, the magazine 19 has a shoulder 21 for preventing titlting of the workpieces during their transfer to the extracting device 22. In a groove 24 of the wall of the magazine 19 there is fixed stop spring 23 which in the position of Fig. 4, enters the channel 20 near the outlet and thus retains the pile of workpieces 25 in the channel 20.

Insertion of the workpieces 25 into the charging device takes place in the direction of the arrow A along the upper chute 12 shaped so that the workpieces 25 drop between the rollers 7 and in the vicinity of the passage 16 into the space 26 lying above the channel 20 (Fig. 2). The workpieces do not slide along the chute 12 perpendicularly downwards, but transversely to the plane of rotation of the rotating rollers 7, so that no obstruction due to the weight of superimposed workpieces can occur. Moreover, the direction of rotation of the driving shaft 4 is chosen in such a way that the rollers 7 rotate away from each other on the side remote from the magazine 19 and the channel 20, as indicated by the arrows D in Figs. 4 and 5. For avoiding any damage of the workpieces, the speed of rotation of the rollers 7 is chosen as low as possible and is for instance 200 r.p.m.

As shown in Fig. 2 a supply line 27 is provided through one of the plugs 2 and leads to the channel 20. Compressed air is intermittently injected into the channel 20 for eliminating therefrom any trace of oil or dirt.

In the present example, the extracting device consists of a gripper 22 which executes a reciprocating motion about the axis 28 in the direction of the arrows E (Fig. 4) under the action of means not illustrated. Whereas one of the jaws 29 of the gripper, having a V-shaped notch 30, is fixed to the arm 31 which is rotatably mounted about the axis 28, the other jaw 32 is rigidly fixed to an arm 33 pivoted about the axis 34 on the arm 31. A leaf spring 35 fixed to the arm 31 tends to rock the arm 33 in the clockwise direction of Figs. 4 and 5. An adjustable stop 36 of the arm 33 serves to control in a manner described below and in cooperation with the wall 43 of the magazine 19 the opening and closing movement of the jaws 29 and 32 of the extracting device 22.

In the casing 1 there is screwed a regulating screw 37 (Fig. 1) the head of which serves in conjunction with a part on which the charging device is fixed by means of the plugs 2, to adapt the position of the charging device with respect to the extracting device 22.

The described and illustrated charging device operates as follows:

The extracting device 22 may for instance be charged with workpieces 25 having a shape as shown in Figs. 6 to 9 having their longitudinal axes as indicated by the lines x—x (Fig. 7). These workpieces are barrel arbors for watch or clock movements and have at the one side of a middle collar 38 a portion 39 of smaller diameter and at the other side of said collar a portion 40 of greater diameter. When going down in the channel 20 the arbors 25 have such a position that their portion 39 can be grasped by the gripper 22. Both rollers 7 must therefore have such a profile that the passage 16 formed therebetween allows the barrel arbors to pass only in the position of the arbor portions 39 and 40 with respect to the middle section plane of the rollers 7 which is prescribed for the above mentioned process and which is shown in Fig. 7. With such a profile of the passage 16 the workpieces 25 can not traverse the passage 16 if their axis is turned by 180° with respect to the position shown in Fig. 7, since then the arbor portion 40 lies in a portion of the passage 16 of smaller width than the diameter of the portion 40, as shown in Fig. 8. Similarly if the axis of the workpiece 25 resting on the rollers 7 is disposed in the longitudinal direction of the channel 20 (Fig. 9), the workpiece 25 can not go through the passage 16, since the collar 38 rests on the rollers 7.

The barrel arbors 25 are fed by a conveyor device which may include a generally vertically extending housing 50 having a passage 51 extending therethrough. A long pitch screw thread 52 extends into the passage 51 along the length thereof. A rotary brush 53 having a supporting mandrel 54 is adapted to be rotated by any conventional means. The rotary brush 53 lifts the barrel arbors 25 which may fall through the return passage and down the return chute 11, as indicated at C. By means of the coaction of the brush 53 with the screw thread 52, the barrel arbors 25 are lifted upwardly as indicated at B to be discharged into the upper chute B as indicated at A vibrator, in the direction of the arrow B (Fig. 1) onto the upper chute 12, and then they slide in the direction of the arrow A into the space 26 (Fig. 2) situated above the passage 16 between the rollers 7. If a workpiece has not the correct position indicated in Fig. 7, allowing it to pass directly into the channel 20 through the passage 16, it is stirred by the rollers 7 on which it rests. If it arrives in this manner in the position in accordance with Fig. 7, it drops through the passage 16 into the channel 20. If, in spite of the rotation of the rollers 7, the workpiece remains some time for example in the position of Fig. 8 or Fig. 9, it is lifted by the spring 17 as the latter passes through the passage 16 and either falls back onto the rollers 7 in a new position which is more favorable or by the side of the rollers 7 into the space 14a from which it returns on the return chute 11 in the direction of the arrow C to the conveyor device which brings it again onto the upper chute 12 in the direction of the arrow B. The spring 17 aids the action of the rollers 7 by causing a slight agitation of the workpieces. When the channel 20 is completely filled up with workpieces, the spring 17, when entering the passage 16, throws back the workpieces situated above the rollers 7, said workpieces then falling back into the space 13, so that no workpieces can gather in an undesirable way above the rollers 7.

As long as the extracting device is in the position of Fig. 4, the spring 23 retains the lowest workpiece 25 and therewith all the other workpieces superposed in the channel 20. Now, if the gripper 22 is rocked with a predetermined rhythm in the clockwise direction of Fig. 4 until after some time the face 41 of the arm 31 strikes against the end 42 of the stop spring 23 and the stop 36 of the arm 33 hits the wall 43 of the magazine 19, the arm 31 turns the spring 23 in the counter-clockwise direction and the wall 43 also turns the arm 33 in the same direction about the axis 34 (Fig. 4) against the action of the spring 35. When the stop spring 23 leaves the channel 20, the lowest workpiece 25 can first of all, not enter between the jaws 29 and 32 since the latter are not yet completely in their open position. On the arm 31 being further rocked and the wall 43 having completely turned the arm 33 (Fig. 5), the arbor portion 39 of the workpiece 25 can fall between the jaws 29 and 32, whereas the arbor portion 40 rests on the shoulder 21 of the magazine 19, so that the workpiece received by the open gripper 22 is prevented from tilting. In this position, the workpiece situated in the gripper retains the other workpieces in the channel 20. Now, if the gripper 22 is moved in the counter-clockwise direction of Fig. 5 and comes back into the position of Fig. 4, it begins to close, since the spring 35 can rock the arm 33 in the clockwise direction. On this backward movement of the gripper, the top edge of the jaw 29 prevents the other workpieces from dropping out of the channel 20 until the stop spring 23 enters the channel 20 and again assumes the function of retaining the workpieces in the channel 20. Only then the gripper 22, which now holds the workpiece under the action of the spring 35, moves away from the channel 20 and finally arrives in the end position shown in Fig. 4. The described cycle may be repeated, after the machining (not described) of the workpiece just extracted has been effected.

If desired, charging operation along the upper chute 12 may continue even if the extraction is not performed sufficiently quickly, since the spring 17 throws the workpieces falling onto the rollers 7 back into the space 13 when the channel 20 is already filled up. Instead of a single spring 17 several springs may be provided on one of the rollers 7. One or more springs might also be provided on both rollers 7. These springs might also be replaced by pins or other ejectors. Instead of a single pair of rollers or other suitable bodies cooperating with each other and controlling the passage of the workpieces, two or more pairs might be provided. The charging device might also be fixed by other means than the plugs 2.

If the thick arbor portion 40 is to be held in the gripper 22 instead of the thin portion 39, the cover 10 is removed, and the rollers 7 are slipped off the splined portion 8a of the shaft 8 and the axes of the rollers 7 are turned by 180°. The rollers are then replaced on the shaft 8 which is again mounted on the bearings 9 and the cover 10 is again secured. The passage 16 whose position is now also turned by 180° longitudinal direction, then allows the workpieces to pass in a position which is turned by 180°, so that the portion 40 of the workpieces 25 is now grasped by the gripper 22. Since the cross-section of the channel 20 is symmetrical and has dimensions corresponding to the thickest arbor portion 40, the workpieces can pass through the channel 20 also in this new position turned by 180°.

In order that the workpieces are thrown back into the space 13 by the spring 17 only when too many workpieces have gathered above the rollers 7, a device as illustrated in Figs. 10 and 11 may be used. An intercepting plate 44 made for instance of light metal or synthetic material traverses a slit 45 of the casing 1 and extends into the space 26 down to the vicinity of the collars 14. The plate 44 has shoulders 46 which bear on the edges of the slit 45. The slit 45 is wide enough with respect to the thickness of the plate 44 that it allows the plate 44 to swing in the plane of Fig. 11 about the axis passing through the shoulders 46 as shown in Fig. 11 by the dash-dotted lines.

Normally the plate 44 is in the vertical position under the action of its own weight and lies by the side of the rollers 7 (position shown in full lines in Fig. 11). If a single workpiece is displaced by the spring 17 and is thrown back against the plate 44, the inertia of the latter is great enough so that the single workpiece rebounds on the plate 44 and returns into the space 26, the plate 44 oscillating with an amplitude too small for allowing the workpiece to pass between the plate 44 and the rollers 7 and to fall into the space 13. Therefore, if the workpiece does not fall back in the correct position onto the rollers 7, it is again stirred by the spring 17 until it can enter the passage 16. On the contrary, if a plurality of workpieces strike against the plate 44, for example if the channel 20 is filled up, the plate 44 effects an oscillation whose amplitude is great enough to allow the workpieces to pass between the plate 44 and the rollers 7 and to arrive in the space 13. Therefore, by the provision of the swingable plate 44 the efficiency of the charging device is increased.

The charging device in accordance with the invention is simple and economical in manufacture, efficient in operation and durable in use. By giving the rollers 7 or other suitable rotating bodies a profile corresponding to the workpieces to be machined, any kind of machines may be fed with workpieces of any shape in a fully automatic way and without injuring the workpieces, the latter being brought to the machining place in any predetermined position.

The charging device in accordance with the invention is preferably, but not exclusively used in fine and precision mechanics, for example in watchmaking. It may serve for charging machine tools, measuring apparatuses and other devices of any kind.

While a representative embodiment and details have been shown for the purpose of illustrating the invention, it will be apparent to those skilled in the art that various changes and modifications may be made therein without departing from the spirit or scope of the invention.

What I claim is:

1. A workpiece handling device for elongated small workpieces of irregular longitudinal cross sectional shape, comprising a casing, a pair of rollers positioned with their axes in a generally horizontal plane and journalled in the casing, and drive means operatively coupled with said rollers for the rotation thereof in opposite directions, the direction of movement of the adjacent surfaces of the rollers being upward, the rollers having their surfaces shaped to provide an outlet passage therebetween for the workpieces to pass while the longitudinal axes of the workpieces are positioned in a generally horizontal plane, a feed channel positioned at one side of the ends of the upper surfaces of the rollers with its mouth above the rollers, a return passage at the side of said rollers opposite to said feed channel and a plate swingingly suspended on said casing between said return passage and said outlet passage yieldingly blocking the return passage, and an expeller spring fixed to one of said rollers and tangentially wound around a portion of said roller with its free end directed opposite to the direction of rotation of the roller.

2. A workpiece handling device for elongated small workpieces of irregular longitudinal cross sectional shape, comprising a casing, a pair of rollers positioned with their axes in a generally horizontal plane and journalled in the casing, and drive means operatively coupled with said rollers for the rotation thereof in opposite directions, the direction of movement of the adjacent surfaces of the rollers being upward, the rollers having their surfaces shaped to provide an outlet passage therebetween for the workpieces to pass while the longitudinal axes of the workpieces are positioned in a generally horizontal plane, a feed channel positioned at one side of the ends of the upper surfaces of the rollers with its mouth above the rollers, a return passage at the side of said rollers opposite to said feed channel and an expeller spring fixed to one of said rollers and tangentially wound around a portion of said roller with its free end directed opposite to the direction of rotation of the roller.

3. A workpiece handling device for elongated small workpieces of irregular longitudinal cross sectional shape, comprising a casing, a pair of rollers positioned with their axes in a generally horizontal plane and journalled in the casing, and drive means operatively coupled with said rollers for the rotation thereof in opposite directions, the direction of movement of the adjacent surfaces of the rollers being upward, the rollers having their surfaces shaped to provide an outlet passage therebetween for the workpieces to pass while the longitudinal axes of the workpieces are positioned in a generally horizontal plane, a feed channel positioned at one side of the ends of the upper surfaces of the rollers with its mouth above the rollers, a return passage at the side of said rollers opposite to said feed channel, a plate swingingly suspended on said casing between said return passage and said outlet passage yieldingly blocking the return passage.

4. A workpiece handling device for elongated small workpieces of irregular longitudinal cross sectional shape, comprising a casing, a pair of rollers positioned with their axes in a generally horizontal plane and journalled in the casing, drive means operatively coupled with said rollers for the rotation thereof in opposite directions, the direction of movement of the adjacent surfaces of the rollers being upward, the rollers having their surfaces shaped to provide an outlet passage therebetween for the workpieces to pass while the longitudinal axes of the workpieces are positioned in a generally horizontal plane, a feed channel positioned at one side of the ends of the upper surfaces of the rollers with its mouth above the rollers, and a return passage beginning above said rollers and provided at the side of said rollers opposite to said feed channel.

5. A workpiece handling device for small workpieces, comprising a casing, a pair of rollers positioned with their axis in a generally horizontal plane and journalled in the casing, drive means operatively coupled with said rollers for the rotation thereof in opposite directions, the direction of movement of the adjacent surfaces of the rollers being upward, the rollers having their surfaces shaped to provide an outlet passage therebetween for the workpieces to pass, a feed channel positioned at one side of the ends of the upper surfaces of the rollers with its mouth above the rollers, and a return passage beginning above said rollers and provided at the side of said rollers opposite to said feed channel.

References Cited in the file of this patent

UNITED STATES PATENTS

| | | |
|---|---|---|
| 1,086,210 | Paridon et al. | Feb. 3, 1914 |
| 1,132,026 | Niggli | Mar. 16, 1915 |
| 1,210,237 | Walker et al. | Dec. 26, 1916 |
| 1,384,844 | Milmoe | July 19, 1921 |
| 1,861,186 | Littell et al. | May 31, 1932 |
| 2,073,964 | Foss | Mar. 16, 1937 |
| 2,367,393 | Green | Jan. 16, 1945 |
| 2,420,299 | Campbell | May 13, 1947 |
| 2,554,699 | Gamble | May 29, 1951 |
| 2,615,556 | Hoopes et al. | Oct. 28, 1952 |